(12) United States Patent
Ha et al.

(10) Patent No.: US 11,657,403 B2
(45) Date of Patent: *May 23, 2023

(54) COMPUTER-IMPLEMENTED SYSTEMS AND METHODS FOR VALIDATING AND RETURNING FRESH ITEMS FOR INVENTORY MANAGEMENT

(71) Applicant: Coupang Corp., Seoul (KR)

(72) Inventors: Hyeona Ha, Bucheon (KR); Jinwon Jeong, Seoul (KR); SungWoo Kang, Seoul (KR); Jeong Seok Oh, Yongin (KR); Sun Young Hong, Seoul (KR)

(73) Assignee: Coupang Corp., Seoul (KR)

( * ) Notice: Subject to any disclaimer, the term of this patent is extended or adjusted under 35 U.S.C. 154(b) by 264 days.

This patent is subject to a terminal disclaimer.

(21) Appl. No.: 17/074,606

(22) Filed: Oct. 19, 2020

(65) Prior Publication Data
US 2021/0103934 A1 Apr. 8, 2021

Related U.S. Application Data

(63) Continuation of application No. 16/553,370, filed on Aug. 28, 2019, now Pat. No. 10,909,546.

(51) Int. Cl.
*G06Q 30/00* (2023.01)
*G06Q 10/08* (2023.01)
(Continued)

(52) U.S. Cl.
CPC ......... *G06Q 30/016* (2013.01); *G06Q 10/087* (2013.01); *G06K 7/1413* (2013.01)

(58) Field of Classification Search
CPC ... G06Q 30/016; G06Q 10/087; G06K 7/1413
See application file for complete search history.

(56) References Cited

U.S. PATENT DOCUMENTS

| 7,689,465 B1 | 3/2010 | Shakes et al. |
| 10,909,546 B1 * | 2/2021 | Ha .................... G06Q 10/087 |

(Continued)

FOREIGN PATENT DOCUMENTS

| CN | 201527676 U | 7/2010 |
| CN | 102073910 A | 5/2011 |

(Continued)

OTHER PUBLICATIONS

Notice of Preliminary Rejection dated Sep. 10, 2021, by the Korean Intellectual Property Office in counterpart Korean Application No. 10-2021-0056717, 10 pages.

(Continued)

*Primary Examiner* — Paul Danneman
(74) *Attorney, Agent, or Firm* — Finnegan, Henderson, Farabow, Garrett & Dunner, LLP

(57) ABSTRACT

Disclosed embodiments provide systems and methods related to managing inventory by validating and returning fresh items for use with a user interface in a fulfillment center. A method for managing inventory comprises receiving, from a mobile device associated with a non-manager, a defect quantity associated with a fresh item, wherein the defect quantity is determined by an acceptability standard retrieved from a database, and storing an inspection task for validating the fresh item by at least one manager if the defect quantity is over a threshold.

20 Claims, 18 Drawing Sheets

(51) Int. Cl.
*G06K 7/14* (2006.01)
*G06Q 30/016* (2023.01)
*G06Q 10/087* (2023.01)

(56) References Cited

U.S. PATENT DOCUMENTS

| | | |
|---|---|---|
| 2014/0222521 A1 | 8/2014 | Chait |
| 2018/0341905 A1 | 11/2018 | Johnsen et al. |
| 2019/0034878 A1 | 1/2019 | Siegel et al. |

FOREIGN PATENT DOCUMENTS

| | | |
|---|---|---|
| CN | 107464078 A | 12/2017 |
| CN | 109903287 A | 6/2019 |
| JP | 2002-193449 | 7/2002 |
| JP | 2003-122817 | 4/2003 |
| KR | 2002-0042173 | 6/2002 |
| KR | 10-2012-0047154 | 5/2012 |
| KR | 10-1612328 | 4/2016 |
| KR | 10-2016-0109432 | 9/2016 |
| KR | 10-2017-0053424 | 5/2017 |
| KR | 10-1835541 | 4/2018 |
| TW | M543430 | 6/2017 |

OTHER PUBLICATIONS

Office Action dated Oct. 25, 2020, by the Korean Patent Office in Korean Application No. 10-2019-0129847, 12 pages.
Examination Notice in corresponding Hong Kong Patent Application No. 22020012661.7, dated Jun. 27, 2022 (4 pages).
Examination Report dated Nov. 23, 2020, by the Australian Patent Office in Australian Patent Application No. 2020260490, 6 pages.
Notice of Allowance dated Feb. 8, 2021, by the Korean Patent Office in Korean Patent Application No. 10-2019-0129847, 5 pages.
Office Action dated Apr. 20, 2021, by the Taiwanese Patent Office in Taiwanese Patent Application No. 109125011, 11 pages.
Examination Notice dated Jul. 22, 2021, from the Hong Kong Patent Office in Hong Kong Application No. 22020012661.7, 7 pages.
Second Examination Report dated Jul. 23, 2021, by the Australian Patent Office in Australian Application No. 2020260490, 4 pages.
Notice of Reasons for Rejection dated Oct. 19, 2021, by the Japanese Patent Office in counterpart Japanese Application No. 2020-569047, 12 pages.

\* cited by examiner

FIG. 1C

| Aggregated Quantity ~461 | 1st Sample ~462 | Internal Check ~463 | 2nd Internal Check when defects ~464 | 2nd Sample ~465 |
|---|---|---|---|---|
| 1 – 25 | 5 | 0 | | 5 |
| 26 – 50 | 5 | 2 | | 5 |
| 51 – 90 | 5 | 3 | | 5 |
| 91 – 150 | 8 | 3 | 1 | 8 |
| 151 – 280 | 13 | 3 | 1 | 13 |
| 281 – 500 | 20 | 5 | 2 | 20 |
| 501 – 1,200 | 32 | 5 | 3 | 32 |
| 1,201 – 3,200 | 50 | 5 | 5 | 50 |
| 3,201 – 10,000 | 80 | 8 | 5 | 80 |
| 10,001 – 35,000 | 125 | 8 | 8 | 125 |
| 35,001 – 150,000 | 200 | 8 | 13 | |
| 150,001 – 500,000 | 315 | | | |
| 500,000 + | 500 | | | |

COMPUTER-IMPLEMENTED SYSTEMS AND METHODS FOR VALIDATING AND RETURNING FRESH ITEMS FOR INVENTORY MANAGEMENT

CROSS-REFERENCE TO RELATED APPLICATIONS

This application is a continuation of and claims the benefit of priority to U.S. application Ser. No. 16/553,370, filed Aug. 28, 2019 (now allowed), the contents of which are hereby incorporated herein by reference.

TECHNICAL FIELD

The present disclosure generally relates to computerized systems and methods for inventory management in fulfillment centers. In particular, embodiments of the present disclosure relate to inventive and unconventional systems relate to computer-implemented systems, methods, and user interfaces for efficiently validating and returning fresh items in a location of a fulfillment center.

BACKGROUND

A shift in consumer spending is changing the fresh product industry. A desire of consumers for fresh food and need for convenience has reshaped the industry to carry more fresh products in fulfillment centers (FCs). However, increased demands for products in the market has caused problems and challenges to the FCs. Although currently existing FCs and systems for inventory management in FCs are configured to handle incoming fresh products, a common issue arises when a FC was not enabled for quick acceptance or rejection of the incoming fresh products. This leads to spoiled products and waste resulting in poor customer satisfaction. For example, fresh products may include dairy products, fruits, a tofu, vegetables, etc., and the fresh products may be spoiled or otherwise unsellable if the products are not quickly stored in FCs or reloaded to a refrigerated delivery truck.

To mitigate such problems, conventional inventory management systems assign workers to validate a quality of incoming fresh products inside FC. While these systems attempt to validate incoming fresh products in an efficient manner many times workers validate an identical fresh product many times and cannot decide conveniently whether to receive or return the fresh product. Moreover, current electronic systems are inflexible in terms of validating defect quantity and efficiently determining whether to return fresh products. Workers have to manually validate the fresh products and cannot make efficient decisions to receive or return the fresh products. Furthermore, current electronic systems do not provide a visibility on how fresh product validations are performed by who and based on which acceptability standard. For example, vendors, managers, and validation workers in FCs do not have a concurrent understanding on why fresh products are accepted or returned.

Therefore, there is a need for improved methods and systems for validating and returning fresh items in a fulfillment center.

SUMMARY

One aspect of the present disclosure is directed to a method for managing inventory by validating and returning fresh items for use with a user interface in a fulfillment center. The method may comprise operations. The operations comprise receiving, from a first mobile device, a request for validating an item and an item identifier associated with the item. The operations further comprise retrieving, from a database, a first acceptability standard including a portion of the item needing validation. After retrieving the first acceptability standard, the operations further comprise responding to the received request by transmitting, to the first mobile device, a request for a defect quantity associated with the item and the retrieved first acceptability standard. The operations further comprise receiving the defect quantity from the first mobile device. After receiving the defect quantity, the operations further comprise storing an inspection task including the received item identifier, the retrieved first acceptability standard, the received quantity of the defected item based on the received quantity of the defected item, and a manager indicator configured to allow only mobile devices associated with at least one manager to access information associated with the inspection task.

Another aspect of the present disclosure is directed to a computer-implemented system for managing inventory by transferring a return item from a return center to fulfillment centers. The computer implemented system may include one or more memory devices storing instructions. The computer-implemented system may also include one or more processors configured to execute the instructions to perform operations as discussed above.

Yet another aspect of the present disclosure is directed to a system comprising the computer-implemented system as discussed above, and a first mobile device. Consistent with disclosed embodiments, the mobile device may include a network interface, one or more memory devices storing instructions, and one or more processors configured to execute the instructions to perform operations. The operations may include transmitting, to the computer-implemented system, a request for validating an item and an item identifier associated with the item and receiving, from the computer-implemented system, a request for a defect quantity associated with the item and a standard. The operations may further include transmitting, to the computer-implemented system, a defect quantity associated with the item. The computer implemented system may include one or more memory devices storing instructions. The computer-implemented system may also include one or more processors configured to execute the instructions to perform operations as discussed above. Other systems, methods, and computer-readable media are also discussed herein.

BRIEF DESCRIPTION OF THE DRAWINGS

Figure 1C:
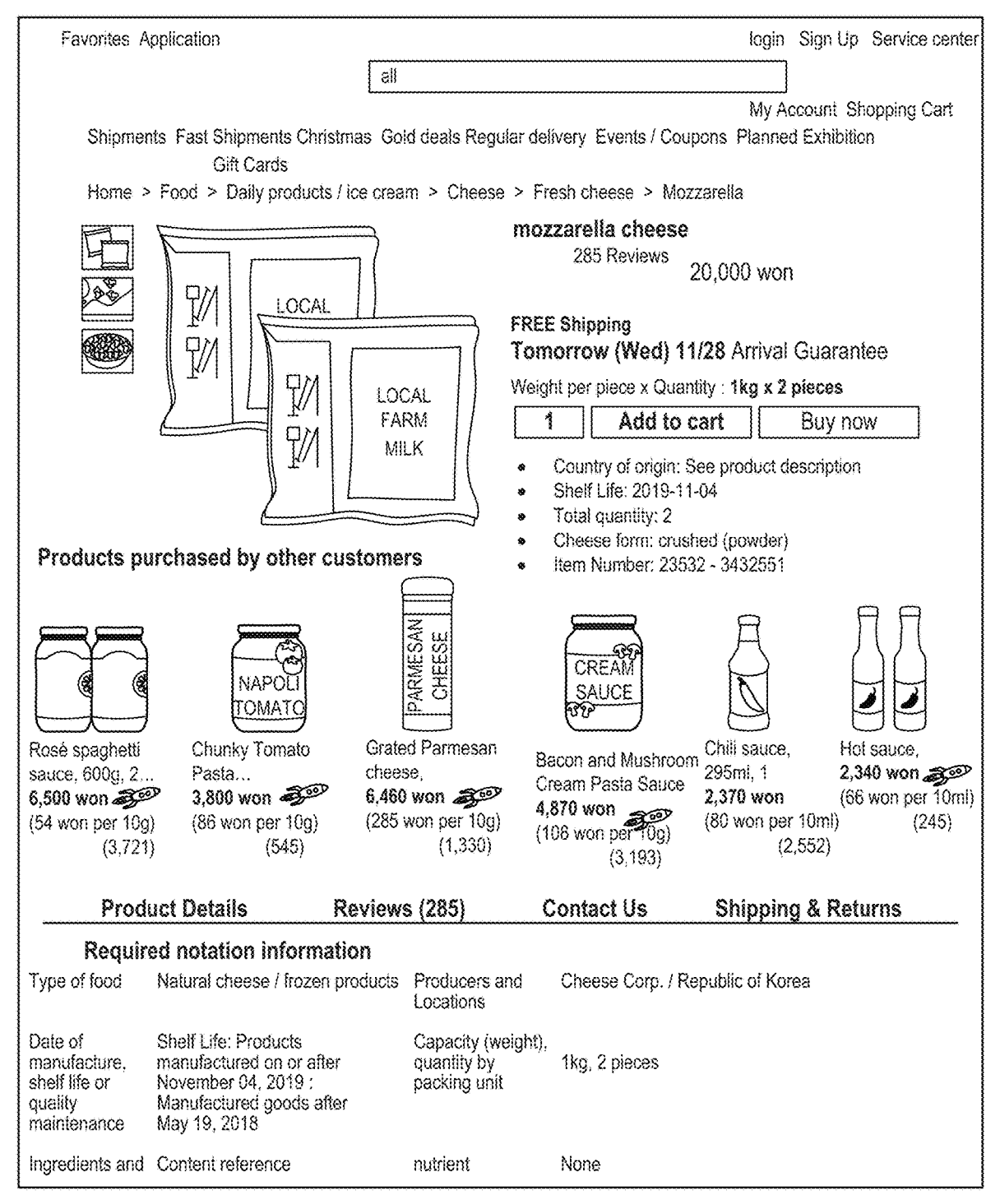

FIG. 1C depicts a sample Single Detail Page (SDP) that includes a product and information about the product along with interactive user interface elements, consistent with the disclosed embodiments.

FIG. 4E depicts an exemplary look-up table.

FIG. 5B depicts exemplary user interfaces for adjusting and transmitting a re-counted defect quantity of fresh inbound item and selecting a return reason.

DETAILED DESCRIPTION

Figure 1A:
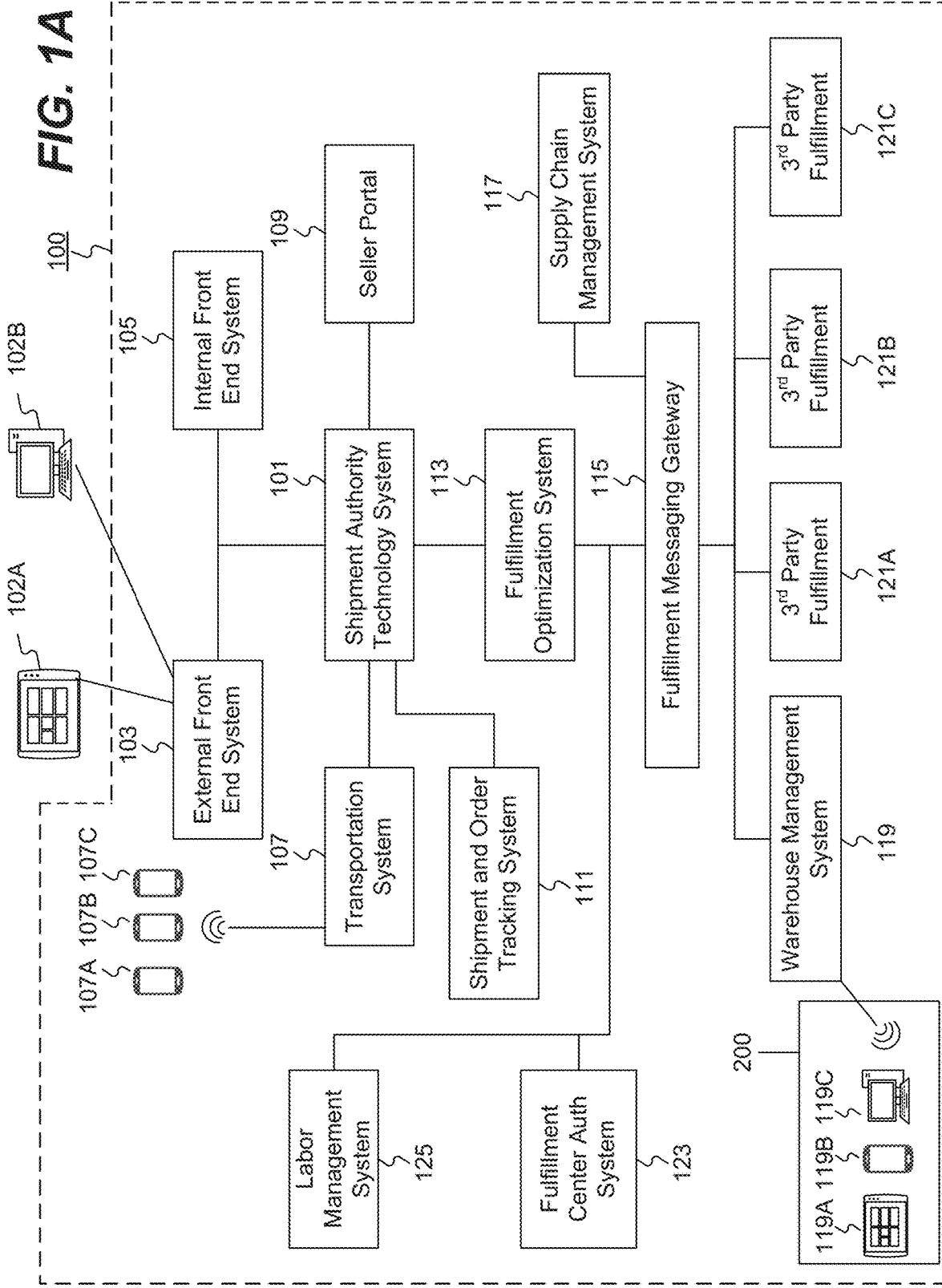
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to computer-implemented systems and methods configured for managing inventories by efficiently validating and returning fresh items in a location of a fulfillment center. The disclosed embodiments provide innovative technical features that enable workers in fulfillment center to receive or return fresh inbound products efficiently and conveniently by using user interfaces. For example, the disclosed embodiments receive a defect quantity associated with a fresh inbound item, wherein the defect quantity is determined by an acceptability standard provided by a vendor associated with the fresh inbound item, store an inspection task for validating the fresh inbound item by at least one manager, receiving a re-counted defect quantity from the manager, and enable the manager to conveniently determine whether to receive or return all or parts of the fresh inbound item by using user interfaces. Moreover, the disclosed embodiments provide innovative technical features that allow a vendor, a worker and a manager in fulfillment centers to have a visibility on how fresh product validation is processed based on which acceptability standard, and who performed the validation. For example, the disclosed embodiments store a mobile device associated with a validator, identifiers associated with fresh products, and acceptability standards associated with fresh products, and enable a vendor, and a worker and a manager in fulfillment centers to perceive a fresh product validation process concurrently.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
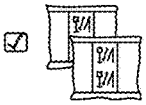
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where a network enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
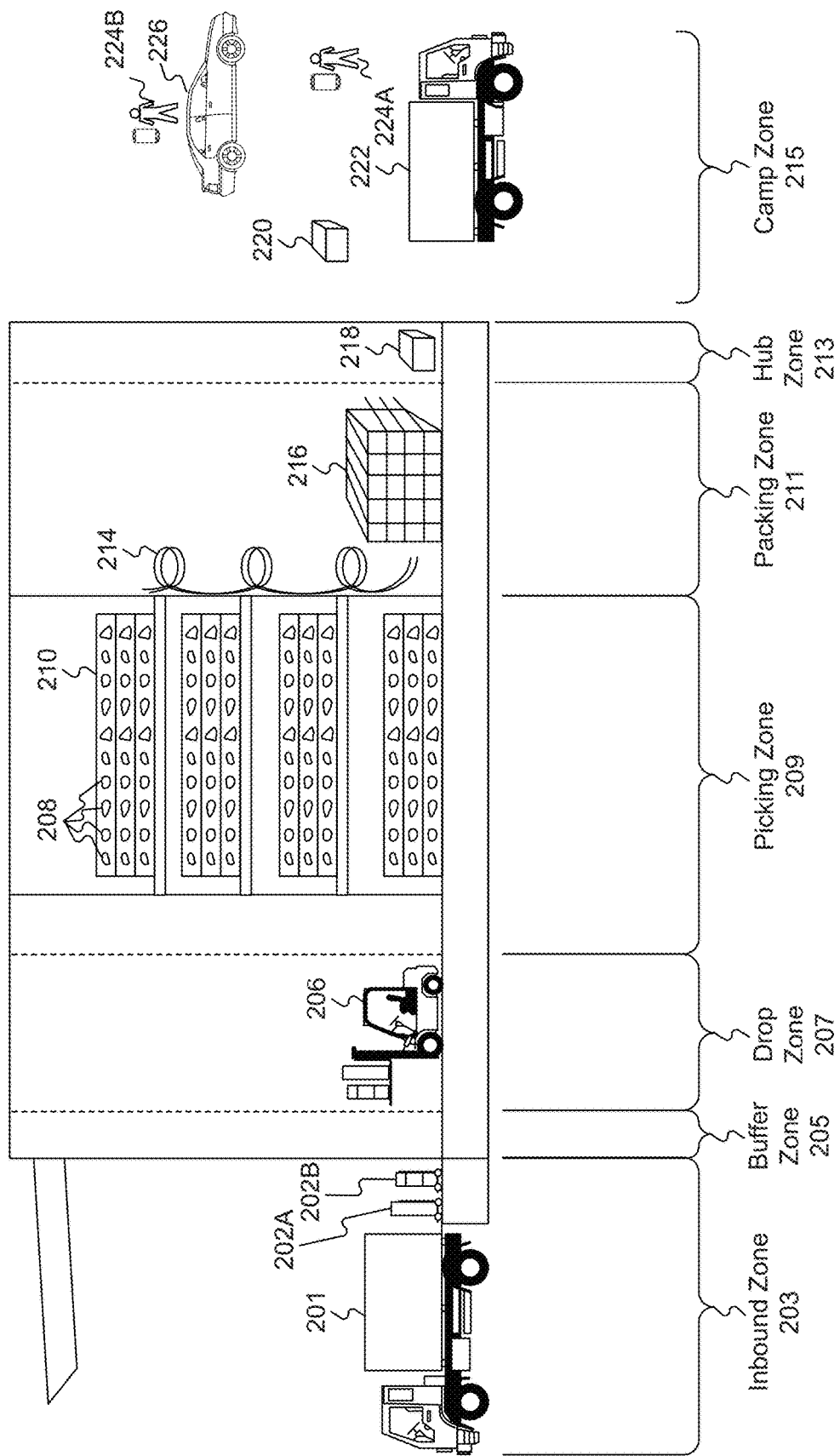
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

According to an aspect of the present disclosure, computer-implemented system for managing inventory may comprise one or more memory devices storing instructions, and one or more processors configured to execute the instructions to perform operations. In some embodiments, the disclosed functionality and systems may be implemented as part of one or more of FO system 113 or WMS 119. The preferred embodiment comprises implementing the disclosed functionality and systems on WMS 119, but one of ordinary skill will understand that other implementations are possible.

While embodiments of the present disclosure relate to scanning a one-dimensional barcode in order to capture identifiers, one of ordinary skill will understand that other data capture implementations (e.g., using QR code, RFID tags, NFC communication, etc.) are possible.

WMS 119, in some embodiments, may be implemented to receive inbound products, including fresh products, and stores information associated with one or more inbound products. In some embodiments, WMS 119 may schedule deliveries of inbound pallets based on a predetermined priority rule. In some embodiments, scheduling inbound deliveries based on the predetermined priority rule may comprise scheduling inbound deliveries based on a type of delivery and a priority level associated with the type of delivery. In some embodiments, a pallet may comprise a shipping pallet comprising one or more products grouped together, such that the one or more products may be transferred simultaneously. However, not all embodiments may relate to inbound pallets. For example, in some embodiments, WMS 119 may schedule deliveries of inbound products based on a predetermined priority rule, and the inbound products may not need to be grouped into inbound pallets. WMS 119 may receive at least one of a waybill number, a reservation number, or a purchase order number associated with the inbound pallet containing at least one product. WMS 119 may modify a database to assign an inbound barcode and at least one of the waybill number, the reservation number, or the purchase order number to the inbound pallet. By way of example, database may store an inventory of every inbound product with its corresponding inbound barcode. Database may further store other information associated with each inbound product, including but not limited to item identifier associated with each product, inbound quantity of each product, location identifier associated with each product, expected delivery date associated with each product, and a timestamp of receiving each product. In some embodiments, database may be incorporated into WMS 119.

FO system 113 is described above as storing information about fulfillment centers designated to store only a particular set of items (e.g., fresh produce or frozen products) as well as associated information (e.g., quantity, size, date of receipt, expiration date, etc.) with respect to FIG. 1A. FO system 113 may also store an acceptability standard of item transmitted from a vendor. The vendor may transmit an acceptability standard of an item to FO system 113 in response to receiving purchase orders. When FO system 113 received the transmitted acceptability standard from the vendor, it may assign and store the acceptability standard to the item. The acceptability standard may include, but not limited to, a proportion of item validation, an inappropriate quantity, a weight, a size, a condition of item, etc.

Figure 3A:
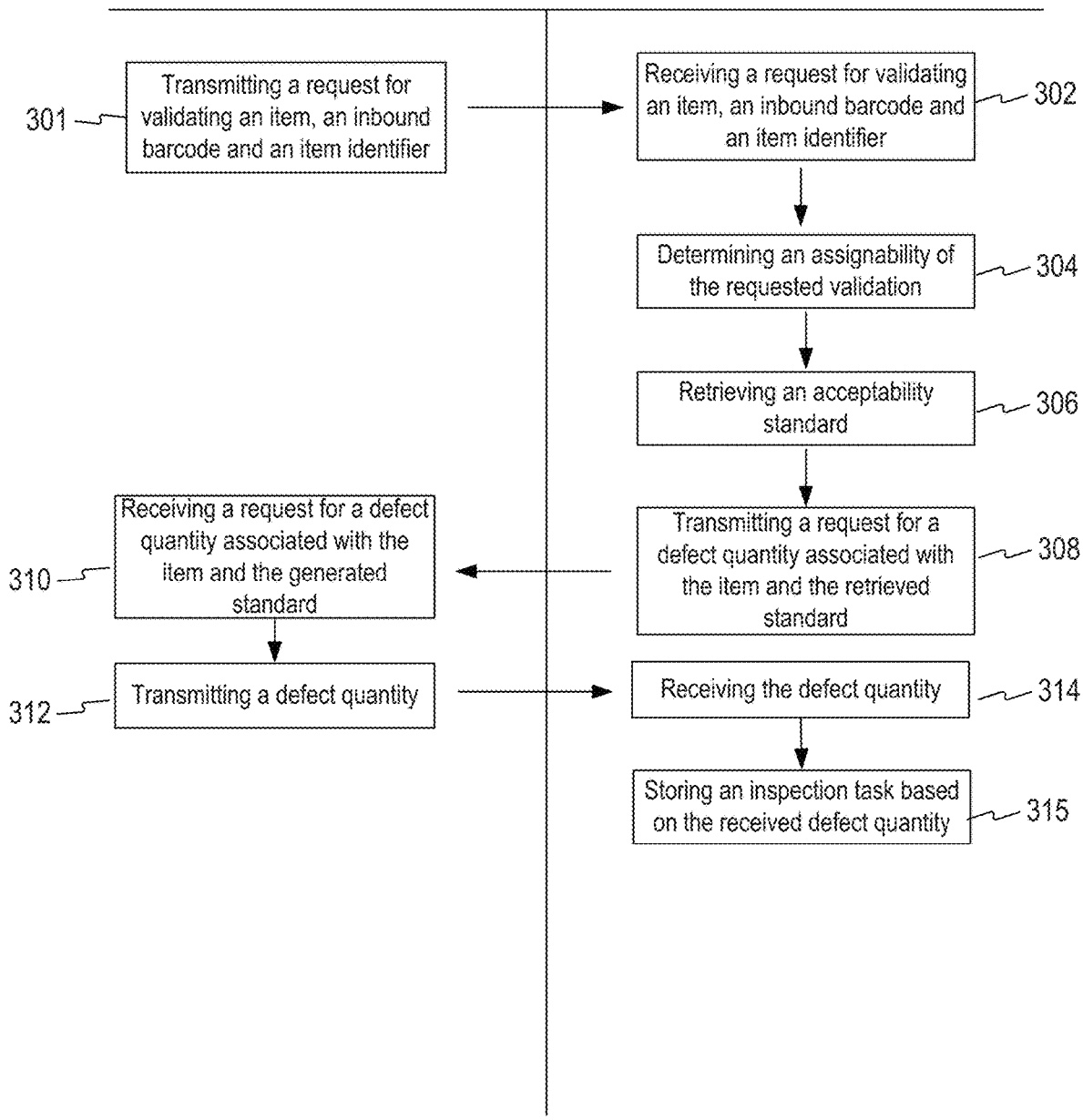
FIG. 3A is an exemplary flow chart of process for validating fresh inbound products by a non-manager.

FIG. 3A is an exemplary flow chart of process 300 for validating fresh inbound products by a non-manager. This exemplary method is provided by way of example. Method 300 shown in FIG. 3A can be executed or otherwise performed by one or more combinations of various systems. Method 300 as described below may be carried out by WMS 119, as shown in FIG. 3A, by way of example. While various elements of WMS 119 are referenced in explaining the method of FIG. 3A, it should be noted that various elements of mobile device 119B (or other devices) may carry out the method of FIG. 3A, as appropriate. Each block shown in FIG. 3A represents one or more processes, methods, or subroutines in the exemplary method 300. Referring to FIG. 3A, exemplary method 300 may begin at block 301.

Figure 4A:
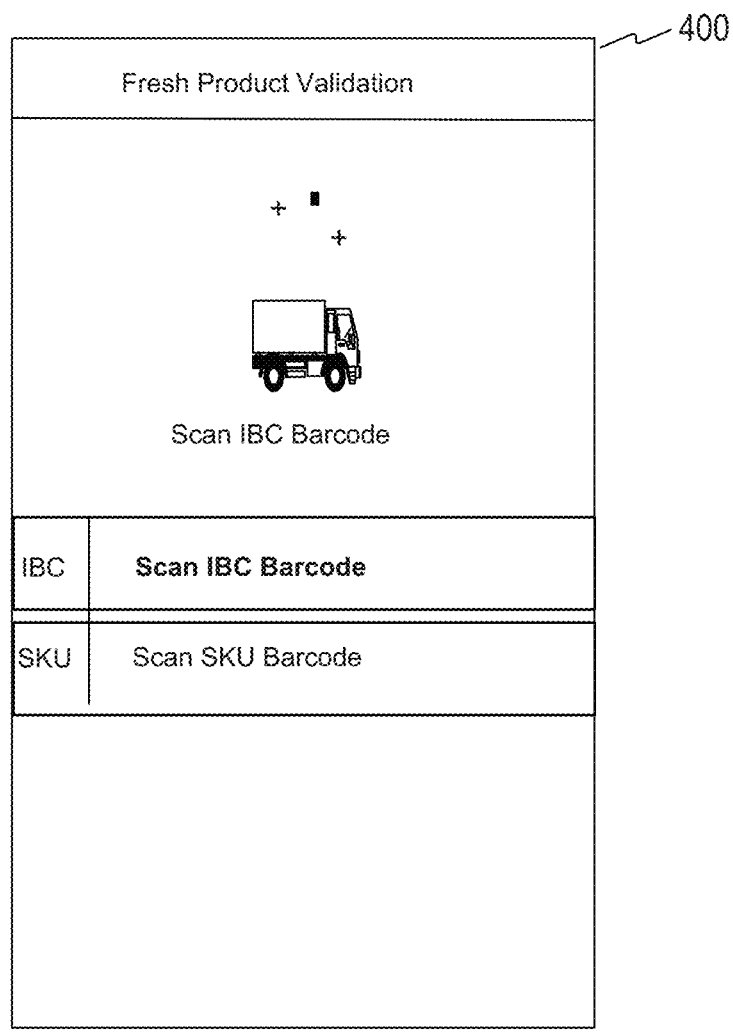
FIG. 4A depicts an exemplary user interface of mobile device for requesting an inbound barcode and an item identifier in the form of barcodes affixed to a pallet or item.

In step 301, mobile device 119B associated with a non-manager may transmit an inbound barcode, an item identifier and a request for validating a fresh inbound item associated with the item identifier to WMS 119. For example, a worker associated with mobile device 119B may scan an item identifier in the form of barcode (SKU Barcode), affixed to a fresh inbound item, and an inbound barcode, affixed to an inbound pallet containing at least one fresh inbound item, and mobile device 119B may transmit the inbound barcode and the item identifier to WMS 119 along with a request for validating a fresh inbound item. An exemplary user interface for transmitting an inbound barcode and an item identifier is illustrated in FIG. 4A and will be discussed below in more detail.

Figure 4B:
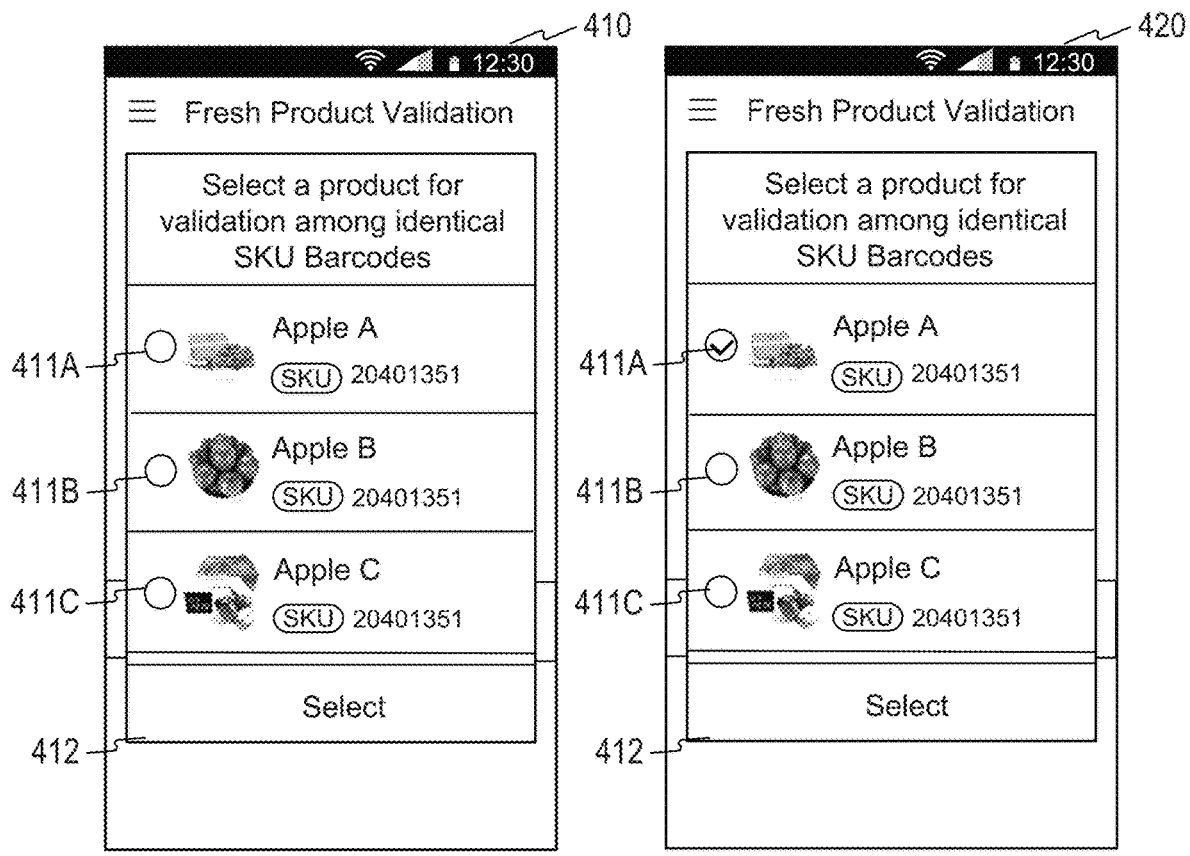
FIG. 4B depicts exemplary user interfaces for selecting an item among items associated with an identical SKU barcode.

In step 302, WMS 119 may receive the transmitted inbound barcode, the transmitted item identifier, and the transmitted request for validating a fresh inbound item associated with the item identifier sent in step 301. The inbound barcode may comprise an identifier used to identify each inbound pallet within FC 200 once the inbound pallet has been delivered to FC 200. For example, WMS 119 may store an inventory of every inbound pallet received in FC 200 as well as details associated with each inbound pallet in database. As such, when a user looks up the inbound barcode in database, mobile device 119B may display the waybill number, the reservation number, and/or the purchase order number associated with the inbound barcode. The item identifier may provide details associated with the fresh inbound item. In some embodiments, WMS 119 may receive an item identifier assigned to multiple items. When the received item identifier is assigned to multiple item identifiers, WMS 119, as depicted in FIG. 4B, may provide a user interface for selecting an item among items with an identical SKU barcode to mobile device 119B. Exemplary user interfaces for selecting an item among items with an identical SKU barcode are illustrated in FIG. 4B and will be discussed below in more detail.

In step 304, WMS 119 may determine an assignability of the requested validation of a fresh inbound item. WMS 119 may look up the received inbound barcode and the received item identifier in a database storing validation tasks, each validation task comprises an inbound barcode and an item identifier. If the stored validation tasks comprised the received inbound barcode and the received item identifier, WMS 119 may provide a notice to the mobile device 119B that a validation of the fresh inbound item associated with the received item identifier is already assigned to another mobile device. Otherwise, WMS 119 may assign a validation task, comprising the received inbound barcode and the received item identifier, to the mobile device 119B and store the validation task in the database. When the validation task is assigned to the mobile device 119B, WMS 119 may determine a sample quantity of the fresh inbound item. The sample quantity may refer to a number of the fresh inbound item needing validation by a non-manager associated with mobile device 119B. In order to determine the sample quantity, WMS 119, first, may aggregate all quantities of the fresh inbound item comprised in at least one purchase order associated with the received inbound barcode.

After aggregating the quantities of the fresh inbound item, WMS 119 may determine a sample quantity of the fresh inbound item based on the aggregated quantity. For example, WMS 119 may determine a proportion of the aggregated quantity as a validation quantity, wherein the proportion is provided by a vendor selling the fresh inbound item and incorporated in the received item identifier. For example, as shown in FIG. 4E, a vendor may provide a proportion 462 corresponding to each aggregated quantity 461 in a predetermined look-up table 460. WMS 119 may access the look-up table 460 and retrieve a proportion 462 corresponding to the aggregated quantity 461. The look-up table 460 may provide various information related to the item for the WMS 119. The look up table may provide an internal check quantity 463. The internal check quantity 463 may refer to a quantity of fresh inbound item a worker is required to open (e.g., cut an apple in half) for the validation of the item. For example, if an aggregated quantity of fresh inbound item is 50, a worker needs to validate five fresh inbound item and among the five items, the worker is required to perform internal check on two items according to the look-up table 460. The look-up table 460 may also provide a second internal check quantity 464 and a second sample quantity 465. The second internal check quantity 464 and the second sample quantity 465, similar to the internal check quantity 463 and the aggregated quantity 461 respectively, may provide validation information to a manager associated with validating a fresh inbound item as described below with respect to FIGS. 3B and 3C. WMS 119 may transmit the various information provided by the look-up table 460 to the mobile device 119B.

In step 306, WMS 119 may retrieve an acceptability standard associated with the received item identifier in a database storing acceptability standards. For example, WMS 119 may transmit a request to fulfillment optimization system 113 to provide an acceptability standard associated with the received item identifier. When fulfillment optimization 113 received such request, it may look up an item associated with the item identifier in a database storing acceptability standards and provide the acceptability standard to WMS 119.

In step 308, WMS 119 may transmit a request for a defect quantity associated with the fresh inbound item and the retrieved acceptability standard to the mobile device 119B. The request may comprise, but is not limited to, an image of the fresh inbound item, a vendor name, a fresh inbound item name, the aggregated quantity, the sample quantity, at least one purchase order, and a manufacturing/expiration date of the fresh inbound item. FO system 113 is described above as storing information about fulfillment centers designated to store only a particular set of items (e.g., fresh produce or frozen products) as well as associated information (e.g., quantity, size, date of receipt, expiration date, etc.) with respect to FIG. 1A. FO system 113 is also described above as storing an acceptability standard of item transmitted from a vendor. The acceptability standard may include, but not limited to, a proportion of item validation, a weight, a size, a condition of item, etc. WMS 119 may request FO system 113 to provide the image, the vendor name, the fresh inbound item name, the manufacturing date and the expiration date. Upon receiving the request, FO system 113 may provide the requested information to WMS 119.

Figure 4C:
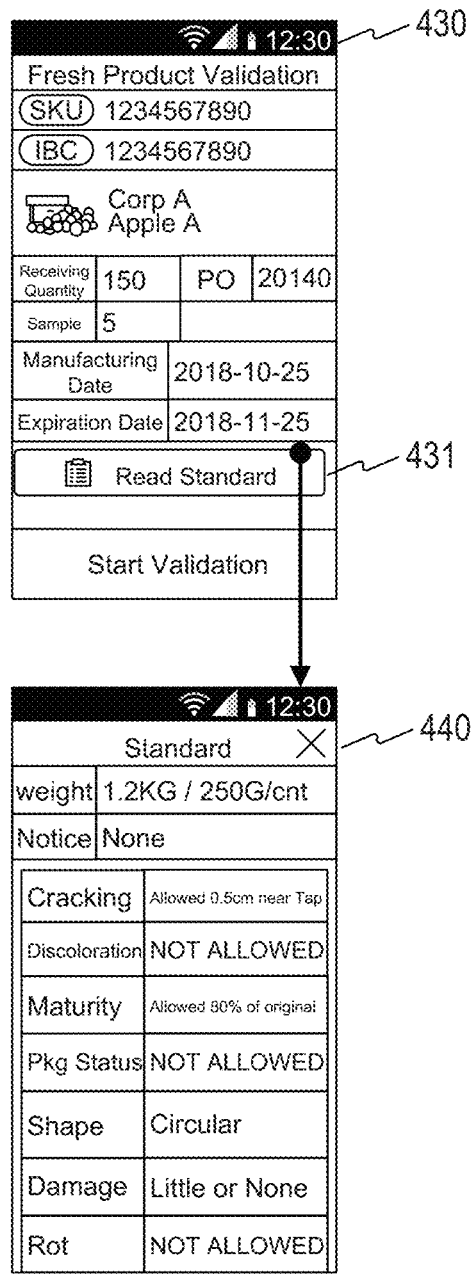
FIG. 4C depicts exemplary user interfaces for displaying a request and an acceptability standard for assisting a worker associated with mobile device in deciding a defect quantity of the fresh inbound item.

In step 310, mobile device 119B may receive the transmitted request and the transmitted acceptability standard sent in step 308. The mobile device 119B may display the received request and the received acceptability standard on its display. The received request, comprising the aggregated quantity, the sample quantity, at least one purchaser order, and the manufacturing/expiration date, and the received acceptability standard may assist a non-manager associated with mobile device 119B in deciding a defect quantity of the fresh inbound item. Exemplary user interfaces for displaying the received request and the received acceptability standard are illustrated in FIG. 4C and will be described below in more detail.

Figure 4D:
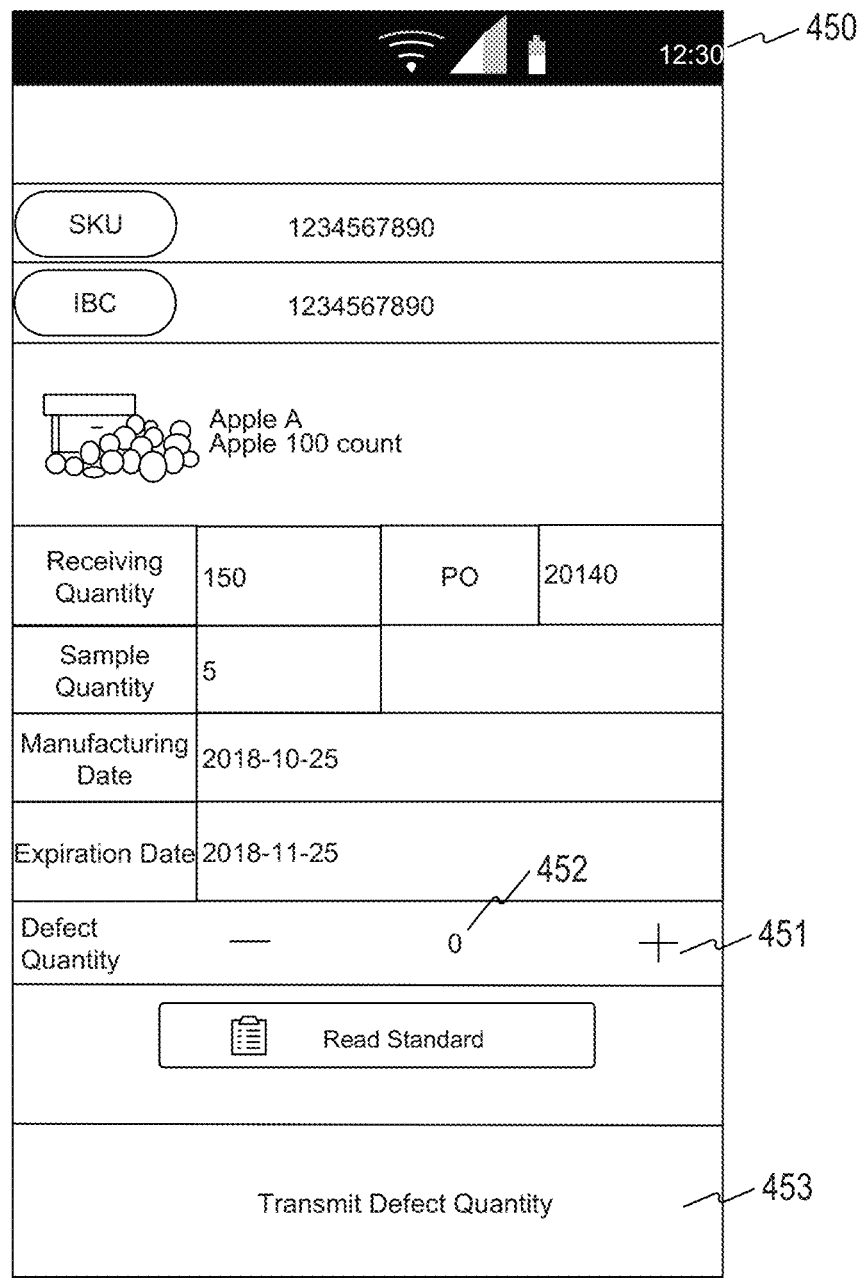
FIG. 4D depicts an exemplary user interface for adjusting and transmitting a defect quantity of fresh inbound item.

In step 312, mobile device 119B may transmit a defect quantity of the fresh inbound item to WMS 119. For example, mobile device 119B may capture a defect quantity based on a user input on a display of the mobile device 119B and transmit the captured defect quantity to WMS 119. The non-manager may transmit the defect quantity by using a pressure-sensitive input mechanism (e.g., a touch-screen device) or any other appropriate selection mechanism on a user interface in a mobile device 119B. An exemplary user interface for transmitting a defect quantity of the fresh inbound item is illustrated in FIG. 4D and will be discussed below in more detail.

In step 314, WMS 119 may receive the defect quantity of the fresh inbound item sent in step 312. When the received defect quantity is greater than zero, WMS 119, in step 315, may store an inspection task including the received inbound barcode, the received item identifier, the image of the fresh inbound item, the vendor name, the fresh inbound item name, the aggregated quantity, the at least one purchase order, the manufacturing date, the expiration date, the received defect quantity, the retrieved acceptability standard, and a manager indicator configured to allow only mobile devices associated with at least one manager to access information associated with the inspection task. The manager indicator may be configured to enable only a mobile device associated with at least one manager to access information associated with the inspection task while preventing mobile devices associated with non-managers from accessing information associated with the inspection task. For example, mobile device 119B associated with at least one manager may display at least one stored inspection tasks for the manager to select for inspecting. By way of further example, mobile device 119B associated with a non-manager may not display any stored inspection tasks.

If the received defect quantity of the fresh inbound item sent in step 312 is equal to zero, WMS 119 may modify a database to assign a proceeding indicator to the inbound barcode and the item identifier. The proceeding indicator may provide information to a worker associated with fulfillment center 200 to proceed with inbound processes as the validation process is completed for the fresh inbound item.

Figure 3B:
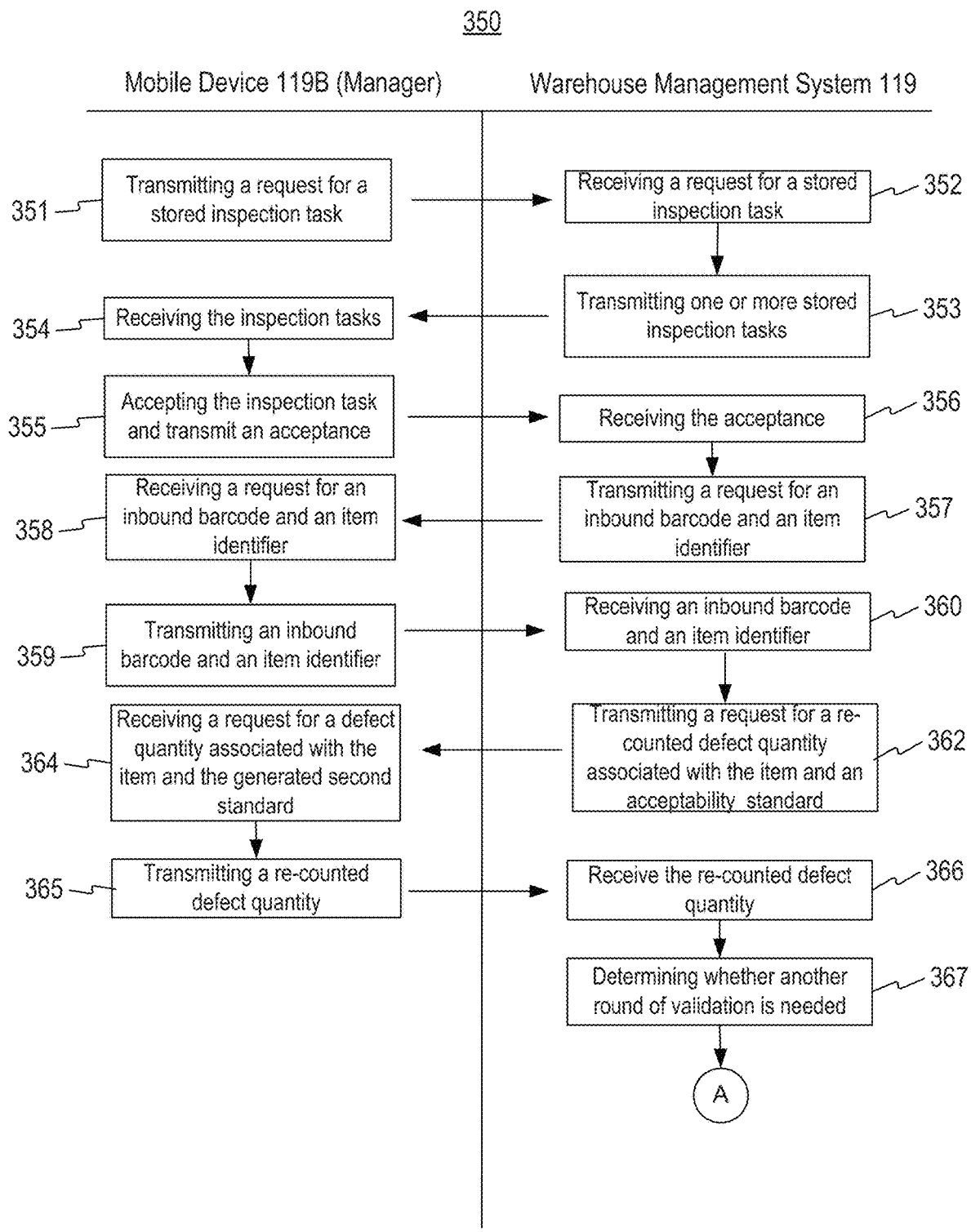
FIG. 3B is an exemplary flow chart of process for validating and returning fresh inbound products by a manager.

FIG. 3B is an exemplary flow chart of process 350 for validating and returning fresh inbound products by a manager. This exemplary method is provided by way of example. Method 350 shown in FIG. 3B can be executed or otherwise performed by one or more combinations of various systems. Method 350 as described below may be carried out by WMS 119, as shown in FIG. 3B, by way of example. While various elements of WMS 119 are referenced in explaining the method of FIG. 3B, it should be noted that various elements of mobile device 119B may carry out the method of FIG. 3B. Each block shown in FIG. 3B represents one or more processes, methods, or subroutines in the exemplary method 350. Referring to FIG. 3B, exemplary method 350 may begin at block 351.

In step 351, mobile device 119B associated with a manager may transmit a request for a stored inspection task to WMS 119. For example, mobile device 119B may transmit a request for a stored inspection task from a user interface in mobile device 119B to WMS 119. The manager may transmit the request by using a pressure-sensitive input mechanism (e.g., a touch-screen device) or any other appropriate selection mechanism on a user interface in a mobile device 119B.

In step 352, WMS 119, may receive the inspection request sent from step 351. WMS 119, upon receiving the request, may verify whether the mobile device 119B, which transmitted the inspection request, is associated with a manager. WMS 119, as discussed above with respect to FIG. 1A, may store information associating one or more devices (e.g., devices 107A-107C or 119A-119C) with one or more users associated with system 100. If mobile device 119B is verified to be associated with a manager, WMS 119 may access a database storing inspection tasks. WMS 119, as discussed above with respect to step 315 in FIG. 3A, may store an inspection task in the database.

In step 353, WMS 119 may transmit one or more stored inspection tasks to the mobile device 119B associated with at least one manager. For example, WMS 119 may transmit a user interface providing inspection tasks to a mobile device 119B of a manager. The inspection task may comprise, but not limited to, an inbound barcode, an item identifier, a vendor name, an item name, a defect quantity, an unloading time, and an urgency indicator.

Figure 5A:
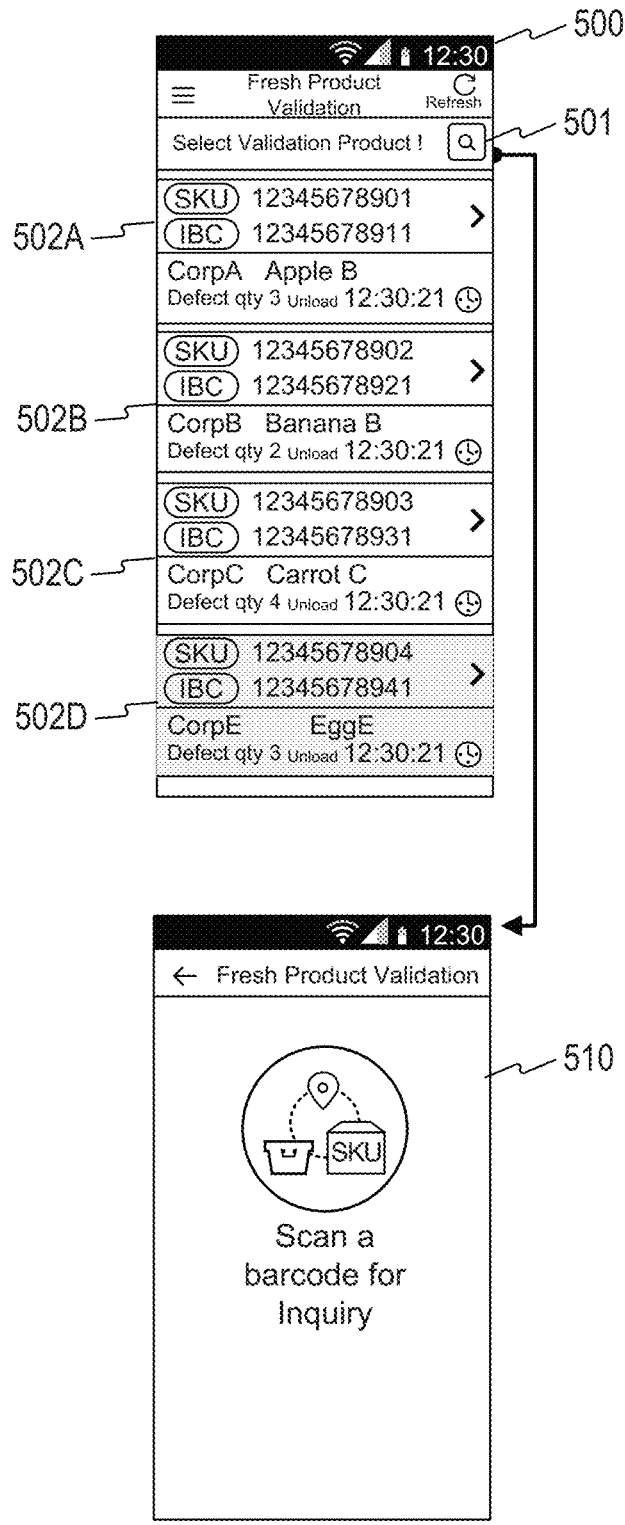
FIG. 5A depicts an exemplary user interface for displaying one or more received inspection tasks.

In step 354, mobile device 119B, associated with at least one manager, may receive the one or more transmitted inspection tasks sent in step 353. For example, mobile device 119B may present a user interface comprising the transmitted inspections tasks. Each of the displayed inspection tasks may include an inbound barcode, an item identifier, a vendor name, an item name, a defect quantity, an unloading time, and an urgency indicator. An exemplary user interface for displaying the received inspections tasks is illustrated in FIG. 5A and will be discussed below in more detail.

In step 355, mobile device 119B may accept one of the received inspection tasks and transmit acceptance of the inspection task by a user input on a user interface in the mobile device 119B to the WMS 119. For example, mobile device 119B may transmit acceptance of the inspection task by capturing input (by receiving a press on one of the received inspections tasks) for selecting an inspection task and transmitting the corresponding selected inspection task to WMS 119.

In step 356, WMS 119 may receive acceptance of the inspection task from mobile device 119B. For example, WMS 119 may receive an acceptance from a mobile application running on mobile device 119B.

In step 357, WMS 119 may transmit a request for an inbound barcode and an item identifier to the mobile device 119B. For example, WMS 119 may transmit, to the mobile device 119B, a user interface requesting an inbound barcode and an item identifier that may be acquired by scanning (by mobile device 119B) barcodes affixed to a pallet or item. The exemplary user interface for requesting an inbound barcode and an item identifier is illustrated in FIG. 4A and will be discussed below in more detail.

In step 358, mobile device 119B may receive the request for an inbound barcode and an item identifier sent in step 357 from WMS 119. For example, mobile device 119B may present a user interface of the transmitted request.

In step 359, mobile device 119B may transmit an inbound barcode and an item identifier to WMS 119. Mobile device 119B may transmit an inbound barcode and an item identifier (SKU barcode) by scanning barcodes affixed to a pallet or item.

In step 360, WMS 119 may receive, from the mobile device 119B, the transmitted inbound barcode and the transmitted requested item identifier sent in step 359. For example, when a manager associated with mobile device 119B scans an inbound barcode and a barcode representing an item identifier, the mobile device 119B may transmit the inbound barcode and the item identifier to WMS 119 automatically. Upon receiving the inbound barcode and the item identifier, WMS 119 may verify whether the received inbound barcode and the received item identifier match an inbound barcode and an item identifier included in the accepted inspection task received in step 356.

In step 362, WMS 119 may transmit a request for a re-counted defect quantity associated with the fresh inbound item and an acceptability standard associated with the inspection task to the mobile device 119B. The request may comprise, but is not limited to, information included in the inspection task, wherein the information includes an image of the fresh inbound item, a vendor name, a fresh inbound item name, an aggregated quantity, a validation quantity, at least one purchaser order, and a manufacturing/expiration date of the fresh inbound item.

Figure 5B:
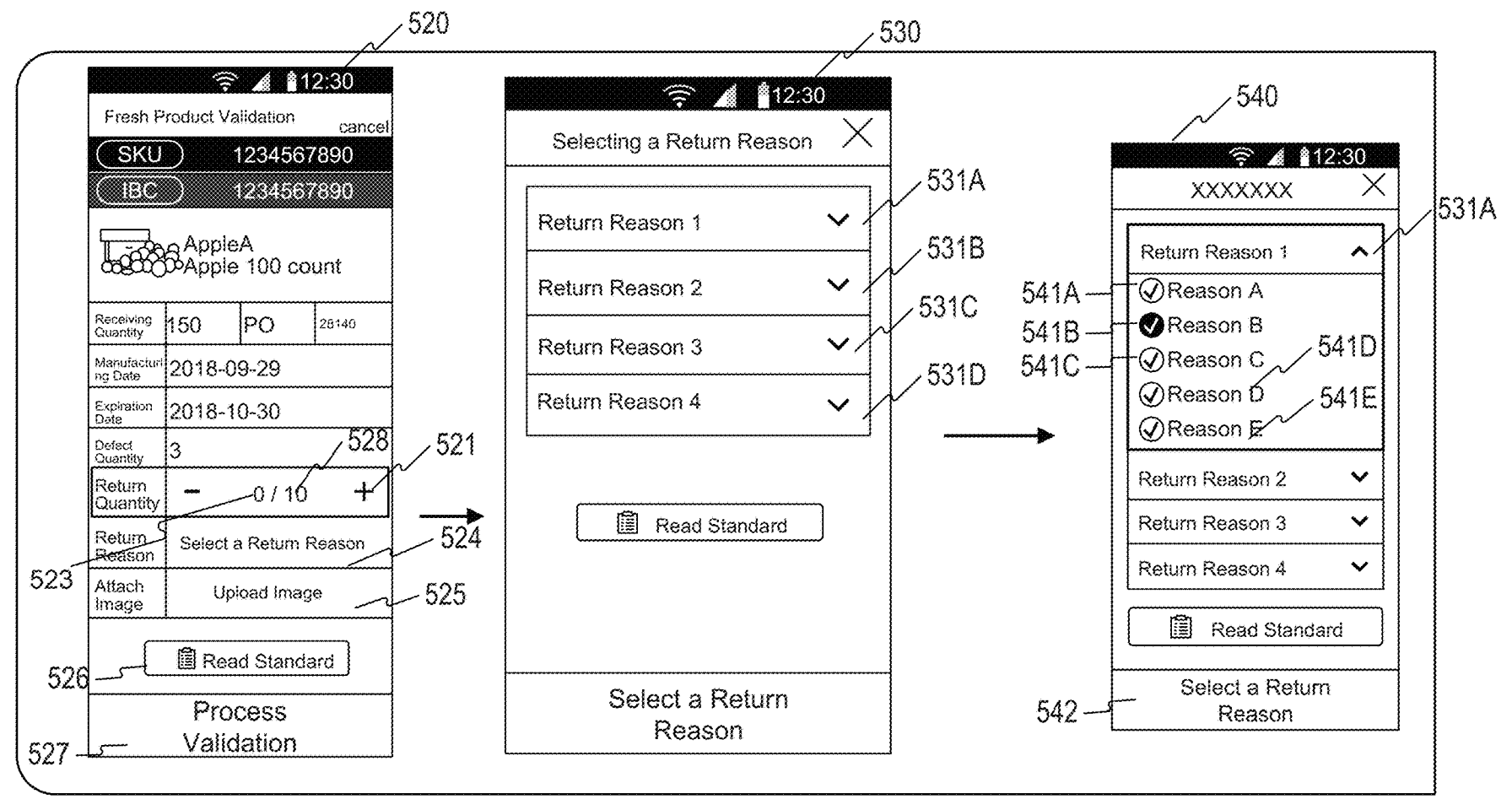

In step 364, mobile device 119B may receive the transmitted request and the transmitted acceptability standard sent in step 362. The mobile device 119B may display the received request and the received acceptability standard on its display. The received request and the received acceptability standard may assist a manager associated with the mobile device 119B in deciding a re-counted defect quantity of the fresh inbound item. An exemplary user interface for displaying the received request and the received acceptability standard is illustrated in FIG. 5B and will be discussed below in more detail.

In step 365, mobile device 119B may transmit a re-counted defect quantity of the fresh inbound item to WMS 119. For example, mobile device 119B may capture a re-counted defect quantity based on a user input on a display of the mobile device 119B and transmit the captured re-counted defect quantity to WMS 119. An exemplary user interface for transmitting a re-counted defect quantity of the fresh inbound item is discussed below with respect to FIG. 5B and will be described in more detail.

In step 366, WMS 119 may receive the transmitted re-counted defect quantity of the fresh inbound item sent in step 365. For example, WMS 119 may receive a re-counted defect quantity from a mobile application running on mobile device 119B.

Figure 3C:
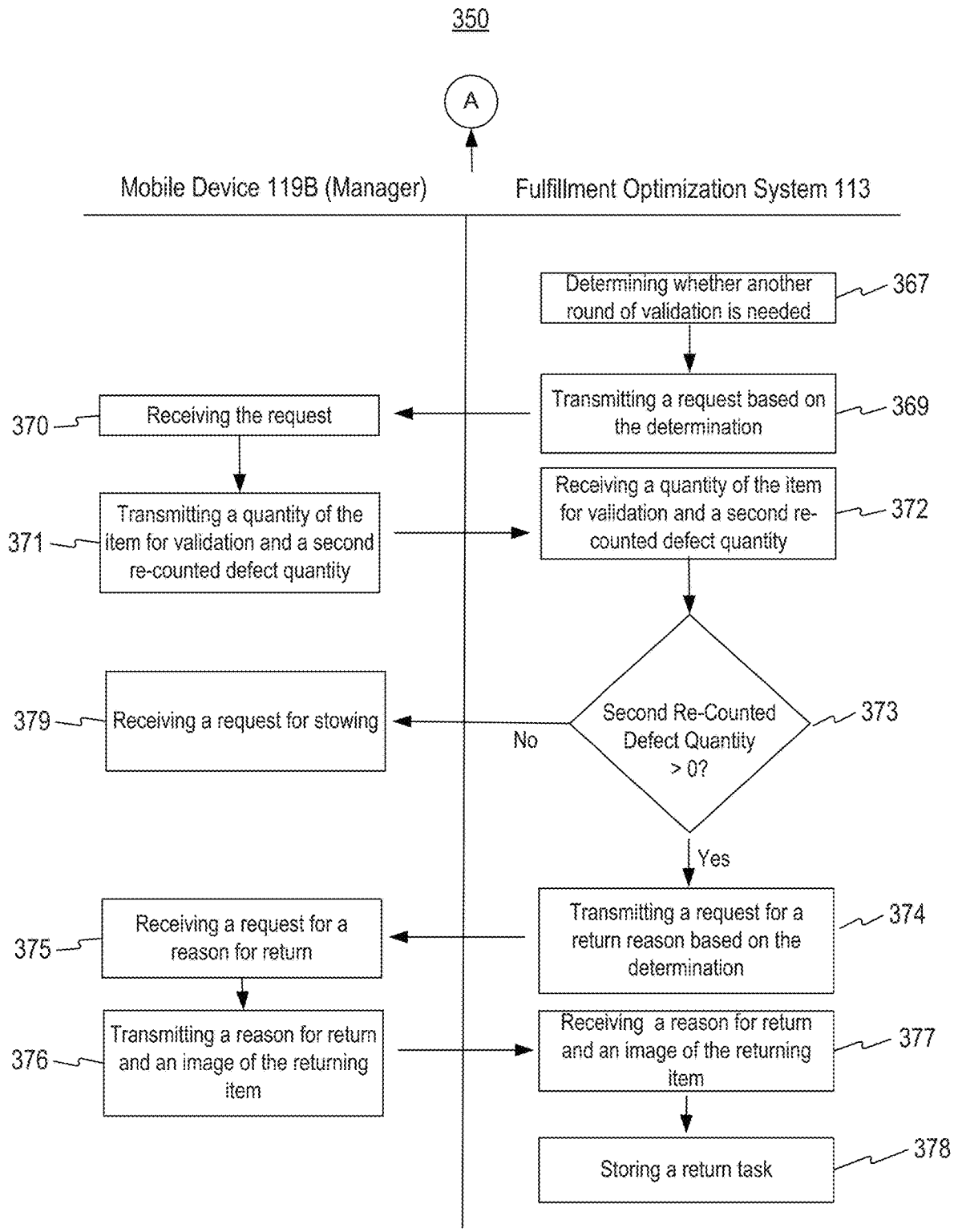
FIG. 3C is a continuing exemplary flow chart of process for validating and returning fresh inbound products by a manager.

FIG. 3C is a continuing exemplary flow chart of process 350 for validating and returning fresh inbound products by a manager.

Figure 5C:
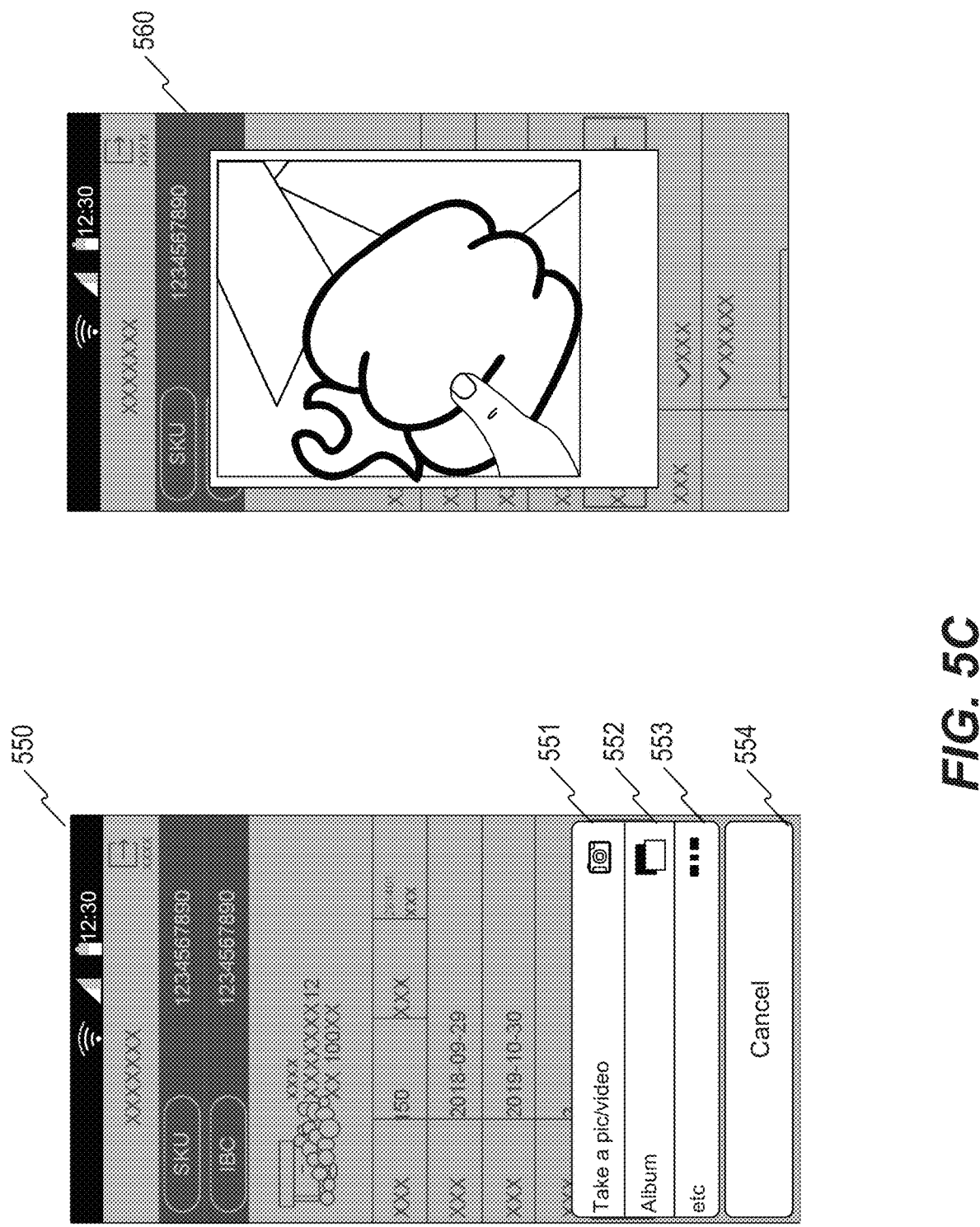
FIG. 5C depicts an exemplary user interfaces for uploading an image of defective fresh inbound item.

In step 367, WMS 119 may determine whether another round of validation is needed based on the received re-counted defect quantity. For example, if the received re-counted defect quantity is equal to zero, WMS 119 may modify a database to assign a proceeding indicator to the inbound barcode and the item identifier. In another example, if the received re-counted defect quantity is greater than zero, WMS 119 may compare an inappropriate quantity associated with the acceptability standard against the received re-counted quantity. If the inappropriate quantity is greater than the received re-counted quantity, WMS 119 may modify a database to assign a partial return indicator to the inbound barcode and the item identifier. Exemplary interfaces for proceeding with a partial return are illustrated in FIGS. 5B and 5C and are described below in more detail. If the inappropriate quantity is less than or equal to the received re-counted defect quantity, WMS may proceed with further steps described in FIG. 3C.

If WMS 119, in step 367, determines to proceed with further steps for validating the fresh inbound item, exemplary method 350 proceeds to step 369.

In step 369, WMS 119 may transmit a request for a second validation quantity and a second re-counted defect quantity associated with the fresh inbound item and the acceptability standard associated with the inspection task to the mobile device 119B. The request may comprise information sent in step 362.

Figure 5D:
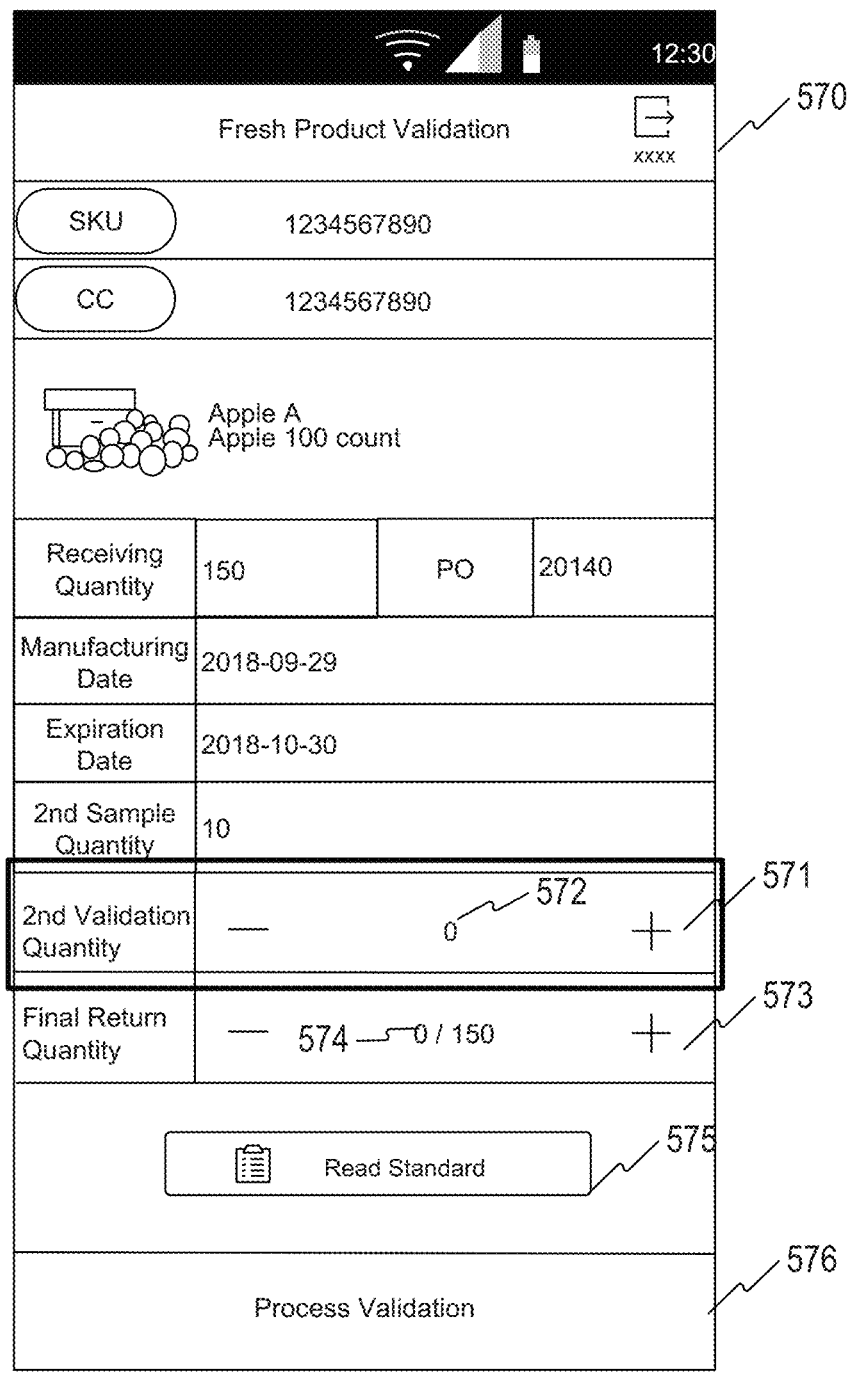
FIG. 5D depicts an exemplary user interface for adjusting and transmitting a second re-counted defect quantity of fresh inbound item.

In step 370, mobile device 119B may receive the transmitted request and the transmitted acceptability standard sent in step 369. Mobile device 119B may display the received request for a second validation quantity and a second re-counted defect quantity, and the received acceptability standard on its display. Exemplary user interface for displaying the received request and the received acceptability standard is illustrated in FIG. 5D and will be described below in more detail.

In step 371, mobile device 119B may transmit a second validation quantity and a second re-counted defect quantity of the fresh inbound item to WMS 119. For example, mobile device 119B may capture a second validation quantity and a re-counted defect quantity based on user inputs on a display of the mobile device 119B and transmit the captured second validation quantity and the captured second re-counted defect quantity to WMS 119. An exemplary user interface for transmitting a re-counted defect quantity of the fresh inbound item is discussed below with respect to FIG. 5D and will be described below in more detail.

In step 372, WMS 119 may receive a second validation quantity and a second re-counted defect quantity of the fresh inbound item sent in step 371. For example, WMS 119 may receive a second validation quantity and a second re-counted defect quantity from a mobile application running on mobile device 119B.

In step 373, WMS 119 may determine whether the received second re-counted defect quantity is greater than zero to decide a return of the fresh inbound item. For example, if the received second re-counted defect quantity is equal to zero, WMS 119 may modify a database to assign a proceeding indicator to the inbound barcode and the item identifier and transmit a request for stowing the fresh inbound item. In step 379, mobile device 119B may receive the transmitted request for stowing the fresh inbound item. In another example, if the received second re-counted defect quantity is greater than zero, WMS 119, in step 374, may transmit a request for a return reason. The request may comprise a request for an image of defective fresh inbound item.

In step 375, mobile device 119B may receive the transmitted request for a return reason sent in step 374. For example, when mobile device 119B receives a request for a return reason, it may display an indication such as comment bubbles including a message to select a return reason and upload images.

In step 376, mobile device 119B may transmit a return reason and an image of defective fresh inbound item to WMS 119. For example, mobile device 119B may capture a return reason and an image of defective fresh inbound item based on user inputs on a display of the mobile device 119B and transmit the captured return reason and the image to WMS 119. Exemplary user interfaces for selecting and transmitting a return reason and an image of defective fresh inbound item are illustrated in FIGS. 5B and 5C and will be described below in more detail.

In step 377, WMS 119 may receive the transmitted return reason and the transmitted image of defective fresh inbound item sent in step 376. For example, WMS 119 may receive a return reason and an image of defective fresh inbound item from a mobile application running on mobile device 119B.

In step 378, WMS 119 may store a return task including the received inbound barcode, the received item identifier, the received return reason, the received image, and a type of return. The type of return is determined by comparing the received second re-counted defect quantity and the aggregated quantity associated with the inspection task. For example, if the received second re-counted defect quantity is less than the aggregated quantity, WMS 119 may assign partial return to the type of return. In another example, if the received second re-counted defect quantity is equal to the aggregated quantity, WMS 119 may assign full return to the type of return.

The stored return task may provide an instruction to mobile device 119B associated with a worker in fulfillment center 200. For example, if a type of return is full return, meaning a return of all fresh inbound item, mobile device 119B may instruct a worker associated with the mobile device 119B to return all the fresh inbound item. In another example, if a type of return is partial return for a stored return task, mobile device 119B may instruct a worker associated with the mobile device 119B to return some of the fresh inbound item and proceed with inbound processes for the remaining fresh inbound item. For example, mobile device 119B may display a message to place the second validation quantity for the fresh products in a tote for return.

FIG. 4A depicts an exemplary user interface 400 of mobile device 119B for requesting an inbound barcode and an item identifier in the form of barcodes affixed to a pallet or item. The user interface 400 may include a message requesting an inbound barcode and an item identifier (a SKU barcode). Mobile device 119B may transmit an inbound barcode and an item identifier by scanning barcodes placed on a pallet containing at least one item or item.

FIG. 4B depicts exemplary user interfaces 410 and 420 for selecting an item among items associated with an identical SKU barcode. User interface 410 may include selectable user interface elements 411A-C corresponding to each item and a button 412. User interface 410 may receive a press on a selectable user interface element to select an item corresponding to the element. User interface 410 may then receive a press on button 412 to transmit selected item to the WMS 119. Exemplary interface 420 depicts selectable user interface element 411A, associated with Apple A, is selected to be transmitted to the WMS 119.

FIG. 4C depicts exemplary user interfaces 430 and 440 for displaying the received request and the received acceptability standard for assisting a worker associated with mobile device 119B in deciding a defect quantity of the fresh inbound item. User interface 430 may display an item identifier and an inbound barcode. User interface 430 may further display an image of fresh inbound item, a vendor name, a fresh inbound item name, an aggregated quantity of fresh inbound item, a sample quantity, a manufacturing date, and an expiration date comprised in a request sent in step 308 from WMS 119. User interface 430 may include a button 431 for generating another user interface displaying acceptability standard for the fresh inbound item. User interface 430 may receive a press on button 431 to generate another user interface 440 displaying an acceptability standard for validating fresh inbound item. User interface 440 may include, but not limited to, standard weight, size, condition, etc. The acceptability standard, presented by user interface 440, may provide guidelines for a worker associated with mobile device 119B in deciding a compliance of each fresh inbound item. For example, a non-manager associated with mobile device 119B may validate a sample quantity of fresh inbound item to decide whether each of the fresh inbound item complies with an acceptability standard. If one of elements included in the acceptability standard does not comply, a worker may use a button 451 described below with respect to FIG. 4D to adjust a defect quantity of the validated fresh inbound item. For example, if a shape of a fresh inbound item does not comply with a shape listed in the acceptability standard, a worker should adjust a defect quantity.

FIG. 4D depicts an exemplary user interface 450 for adjusting and transmitting a defect quantity of fresh inbound item. User interface 450 may include a button 451, an indicator 452, and a button 453. Button 451 may adjust a defect quantity. The defect quantity may be adjusted manually by pressing a "+" or "−" symbol. A result of the adjustment may be displayed by indicator 452. User interface 450 may then receive a press on button 453 to transmit the defect quantity represented by the indicator 452 to WMS 119. For example, a worker associated with mobile device 119B may press button 451 to adjust a defect quantity and press button 453 to transmit the adjusted defect quantity to WMS 119.

FIG. 5A depicts an exemplary user interface 500 for displaying one or more received inspection tasks. User interface 500 may include a button 501 and one or more inspection tasks in the form of buttons 502A-D. Each inspection task may comprise an item identifier in the form of SKU barcode, an inbound barcode, a vendor name, a fresh inbound item name, a defect quantity, an unloading time, and an urgency indicator. The urgency indicator may provide when a delivery truck for returning fresh products is expected to leave and may be displayed in different colors to present a degree of urgency. For example, an urgency indicator displayed in red has priority over an urgency indicator displayed in green in terms of validating a corresponding fresh inbound item. User interface 500 may receive a press on buttons 502A-D for selecting and transmitting an inspection task corresponding to the pressed button. For example, a manager associated with the mobile device 119B may select an inspection task by pressing a button on a screen of mobile device 119B corresponding to the inspection task. User interface 500 may then transmit the selected inspection task to WMS 119 in step 355 as described above with respect to FIG. 3B.

Button 501 may allow the mobile device 119B to scan an inbound barcode and an item identifier to determine whether a pallet containing at least one fresh inbound item needs an inspection. For example, mobile device 119B may transmit an inbound barcode and an item identifier to WMS 119 by scanning barcodes affixed to a pallet or item. WMS 119, upon receiving the barcodes, may transmit a button similar to 502A-D, if a fresh inbound item associated with the received barcodes needs inspection, to the mobile device 119B. If the fresh inbound item does not need inspection, WMS 119 may transmit a message to the mobile device 119B that the item does not need inspection.

FIG. 5B depicts exemplary user interfaces 520, 530, and 540 for adjusting and transmitting a re-counted defect quantity of fresh inbound item and selecting a return reason.

User interface 520 may include buttons 521, 524, 525, 526, and 527, and indicators 523 and 528. User interface 520 may display similar contents displayed by user interface 450. Buttons 521 and 527 and indicators 523 and 528 may perform the functions as buttons 451 and 453 and indicator 452 do in user interface 450 described above with respect to FIG. 4D. Button 526 may generate an interface similar to user interface 440 for displaying acceptability standard as button 431 does in user interface 430 illustrated in FIG. 4C. User interface 520 may further display a defect quantity.

Button 524 may generate another user interface 530 for selecting a return reason. User interface 520 may receive a press on button 524 to generate another user interface 530 for selecting a return reason.

Indicator 528 may provide a second sample quantity for validating a fresh inbound item. For example, as shown in FIG. 4E, a vendor may provide a second sample quantity 464 corresponding to each aggregated quantity 461 in a predetermined look-up table 460. WMS 119 may access the look-up table 460 and retrieve a second sample quantity 464 corresponding to the aggregated quantity 461.

User interface 530 may include dropdown menus 531A-D. When user interface 530 receives a press on one of the dropdown menus 531A-D, user interface 530 may allow mobile device 119B to select one of selectable interface elements 541A-E, such as checkboxes each representing a return reason, corresponding to the pressed dropdown menu.

Exemplary user interface 540 depicts enabling mobile device 119B to select selectable interface element 541B corresponding to one of reasons for return when dropdown menu 531A is pressed. Button 542 may store the selected return reason to be transmitted when button 527 is pressed in step 376 as discussed above with respect to FIG. 3C.

Button 525 may generate another user interface 550 in FIG. 5C for uploading an image of fresh inbound item. User interface 520 may receive a press on button 525 to generate another user interface 550 for selecting a return reason.

FIG. 5C depicts exemplary user interfaces 550 and 560 for uploading an image of defective fresh inbound item. User interface 550 may include buttons 551, 552, 553 and 554. Button 551 may allow mobile device 119B to take a picture of defective fresh inbound item using a camera associated with the mobile device 119B. Button 552 may allow mobile device 119B to retrieve an image of defective fresh inbound item from stored images of the mobile device 119B. Button 553 may allow a user to upload an image using various ways (e.g., uploading images not stored in the album). Button 554 may allow mobile device to cancel the image uploading process.

User interface 560 depicts an image of defective fresh inbound item. Mobile device 119B allows a user to select an image to display the image of defective fresh inbound item with more detail.

FIG. 5D depicts an exemplary user interface 570 for adjusting and transmitting a second re-counted defect quantity of fresh inbound item. User interface 570 may include buttons 571, 573, 575, and 576 and indicators 572 and 574. User interface 570 may display similar contents displayed by user interface 450 and user interface 520. Buttons 573, 575, and 576 and indicator 574 may perform the described above with respect to as buttons 521, 526 and 527 and indicator 623 in FIG. 5B. Button 575 may generate an interface similar to user interface 440 for displaying acceptability standard as button 431 does in user interface 430 illustrated in FIG. 4C. User interface 570 may further display a second sample quantity representing how many fresh inbound items were validated when a re-counted defect quantity was received. The second sample quantity, as discussed above with respect to FIG. 5B, may correspond to each aggregated quantity 461 in a predetermined look-up table 460 in FIG. 4E. WMS 119 may access the look-up table 460 and retrieve a second sample quantity 464 corresponding to the aggregated quantity 461. Button 571 may adjust a quantity of fresh inbound item for validation. The quantity of fresh inbound item for validation may represent how many fresh inbound items has been validated for transmitting a second re-counted defect quantity of the fresh inbound item. The quantity of fresh inbound item for validation may be adjusted manually by pressing a "+" or "−" symbol. A result of the adjustment may be displayed by indicator 572. User interface 570 may then receive a press on button 576 to transmit the second re-counted defect quantity represented by the indicator 574 and the quantity of fresh inbound item for validation represented by the indicator 572 to WMS 119.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

One or more memory devices may store data and instructions used to perform one or more features of the disclosed embodiments. For example, memory may represent a tangible and non-transitory computer-readable medium having stored therein computer programs, sets of instructions, code, or data to be executed by processor. Memory may include, for example, a removable memory chip (e.g., EPROM, RAM, ROM, DRAM, EEPROM, flash memory devices, or other volatile or non-volatile memory devices) or other removable storage units that allow instructions and data to be accessed by processor.

One or more memory devices may also include instructions that, when executed by processor, perform operations consistent with the functionalities disclosed herein. Devices consistent with disclosed embodiments are not limited to separate programs or computers configured to perform dedicated tasks. For example, memory may include one or more programs to perform one or more functions of the disclosed embodiments.

One or more processors may include one or more known processing devices, such as a microprocessor from the Pentium™ or Xeon™ family manufactured by Intel™, the Turion™ family manufactured by AMD™, the "Ax" or "Sx" family manufactured by Apple™, or any of various processors manufactured by Sun Microsystems. The disclosed embodiments are not limited to any type of processor(s).

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for validating and returning fresh items, comprising:
   one or more memory devices storing instructions; and
   one or more processors configured to execute the instructions to perform operations comprising:
   transmitting, to a first mobile device, a request for a defect quantity associated with an item;
   receiving the defect quantity from the first mobile device;
   receiving a re-counted quantity of the item for return from a second mobile device;
   based on a determination on the necessity of another round of validation:
   transmitting a request for a quantity of the item for validation and a second re-counted quantity of the item for return to the second mobile device,
   modifying the database to assign an indicator associated with the determination to an inbound identifier, and
   modifying a user interface of the first mobile device to include the assigned indicator associated with the determination.

2. The computer-implemented system of claim 1, wherein the operations further comprise:
   transmitting a request for the inbound identifier to the first mobile device; and receiving the inbound identifier from the first mobile device.

3. The computer-implemented system of claim 1, wherein the operations further comprise:
receiving, from the first mobile device, a request for validating the item and an item identifier associated with the item; and
retrieving, from a database, a first acceptability standard including a portion of the item needing validation.

4. The computer-implemented system of claim 3, wherein the first acceptability standard includes an inbound quantity, an order number, a manufacturing date, and an expiration date.

5. The computer-implemented system of claim 4, wherein the operations further comprise transmitting a user interface that includes selectable interface elements respectively corresponding to the one or more items for validation when multiple items correspond to the received item identifier to the first mobile device.

6. The computer-implemented system of claim 4, wherein the operations further comprise:
receiving, from the second mobile device, a quantity of the item for validation and a second re-counted quantity of the item for return;
determining a return of all, part, or none of the item based on a comparison between the received second re-counted quantity of the item for return and an inbound quantity of the item;
transmitting a request for a reason for return based on the determination on the return to the second mobile device;
receiving, from the second mobile device, a reason for return and an image of the returning item; and
storing a return task including the received item identifier, the received second re-counted quantity of the item, and the reason for return.

7. The computer-implemented system of claim 6, wherein the operations further comprise transmitting a user interface including a button for selecting a reason for return and a button for attaching an image of the returning item when the second re-counted quantity of the item for return is greater than zero to the second mobile device.

8. The computer-implemented system of claim 6, wherein the operations further comprise storing a return task configured to instruct the first mobile device to process a partial return when the received second re-counted quantity of the item is fewer than the inbound quantity of the item.

9. The computer-implemented system of claim 6, wherein the operations further comprise storing a return task configured to instruct the first mobile device to process a full return when the received second re-counted quantity of the item matches the inbound quantity of the item.

10. The computer-implemented system of claim 1, wherein the operations further comprise providing, for presentation via the second mobile device, a user interface that includes selectable interface elements respectively corresponding to one or more transmitted inspection tasks, each of the inspection tasks including an item identifier, an inbound identifier, an item name, a quantity of the item, and an item unloading time.

11. A computer-implemented method for validating and returning fresh items, comprising:
transmitting, to a first mobile device, a request for a defect quantity associated with an item;
receiving the defect quantity from the first mobile device;
receiving a re-counted quantity of the item for return from a second mobile device;
based on a determination on the necessity of another round of validation:
transmitting a request for a quantity of the item for validation and a second re-counted quantity of the item for return to the second mobile device,
modifying the database to assign an indicator associated with the determination to an inbound identifier, and
modifying a user interface of the first mobile device to include the assigned indicator associated with the determination.

12. The computer-implemented method of claim 11, further comprising:
transmitting a request for the inbound identifier to the first mobile device; and
receiving the inbound identifier from the first mobile device.

13. The computer-implemented method of claim 11, further comprising:
receiving, from the first mobile device, a request for validating an item and an item identifier associated with the item; and
retrieving, from a database, a first acceptability standard including a portion of the item needing validation.

14. The computer-implemented method of claim 13, wherein the first acceptability standard includes an inbound quantity, an order number, a manufacturing date, and an expiration date.

15. The computer-implemented method of claim 14, further comprising transmitting a user interface that includes selectable interface elements respectively corresponding to the one or more items for validation when multiple items correspond to the received item identifier to the first mobile device.

16. The computer-implemented method of claim 14, further comprising:
receiving, from the second mobile device, a quantity of the item for validation and a second re-counted quantity of the item for return;
determining a return of all, part, or none of the item based on a comparison between the received second re-counted quantity of the item for return and an inbound quantity of the item;
transmitting a request for a reason for return based on the determination on the return to the second mobile device;
receiving, from the second mobile device, a reason for return and an image of the returning item; and
storing a return task including the received item identifier, the received second re-counted quantity of the item, and the reason for return.

17. The computer-implemented method of claim 16, further comprising transmitting a user interface including a button for selecting a reason for return and a button for attaching an image of the returning item when the second re-counted quantity of the item for return is greater than zero to the second mobile device.

18. The computer-implemented method of claim 16, further comprising storing a return task configured to instruct the first mobile device to process a partial return when the received second re-counted quantity of the item is fewer than the inbound quantity of the item.

19. The computer-implemented method of claim 16, further comprising storing a return task configured to instruct the first mobile device to process a full return when the received second re-counted quantity of the item matches the inbound quantity of the item.

20. The computer-implemented method of claim 11, further comprising providing, for presentation via the second mobile device, a user interface that includes selectable interface elements respectively corresponding to one or more transmitted inspection tasks, each of the inspection tasks including an item identifier, an inbound identifier, an item name, a quantity of the item, and an item unloading time.

* * * * *